United States Patent

Montagnino

[11] 3,918,313
[45] Nov. 11, 1975

[54] DRIVE MECHANISM

[75] Inventor: James G. Montagnino, Monroe, Conn.

[73] Assignee: Pitney-Bowes, Inc., Stamford, Conn.

[22] Filed: July 19, 1974

[21] Appl. No.: 490,196

[52] U.S. Cl. .................... 74/393; 74/435; 74/437; 74/567
[51] Int. Cl.² ......................................... F16H 35/02
[58] Field of Search ............ 74/567, 435, 436, 437, 74/393

[56] References Cited
UNITED STATES PATENTS

| | | | |
|---|---|---|---|
| 2,866,353 | 12/1958 | Ewing | 74/437 |
| 2,986,949 | 6/1961 | Lancaster et al. | 74/567 |
| 3,590,661 | 7/1971 | Chaveneaud | 74/437 X |

OTHER PUBLICATIONS

Rothbart, H. A., Cams, N.Y., John Wiley & Sons, Inc., 1956, p. 174.

*Primary Examiner*—Benjamin W. Wyche
*Assistant Examiner*—F. D. Shoemaker
*Attorney, Agent, or Firm*—William D. Soltow, Jr.; Albert W. Scribner; Martin D. Wittstein

[57] ABSTRACT

A three-phase transmission drive mechanism is described which includes a drive gearing operatively disposed between an input drive shaft and an output or driven shaft, whereby a substantially uniform one revolution drive motion of said input shaft produces a three-phase motion for said output shaft which includes an acceleration phase, a substantially uniform speed phase and finally a deceleration phase. The mechanism includes a pair of conjugate cams and associated cam followers that are mounted for movement with said input and output shafts respectively so as to generate said acceleration and deceleration phases. The novel aspects of the arrangement include the provision of a structural interference fit between said conjugate cams and cam followers, this interference fit resulting in an opposed torsional loading of said shafts so as to eliminate the operational backlash otherwise existing in said drive mechanism during said acceleration and deceleration motion phases.

1 Claim, 4 Drawing Figures

DRIVE MECHANISM

This invention relates to an improved drive mechanism which affords zero backlash operation during a predetermined portion of the movement of said mechanism. More particularly the invention relates to a novel three-phase transmission drive mechanism having an opposed torsional backlash eliminating load applied thereto during the acceleration and deceleration phases of each cycle of operation of said drive mechanism.

BACKGROUND OF THE INVENTION

There are many applications where it is desired to cyclically drive an output shaft in a controlled variable speed manner as for example from a one-revolution clutch or the like. In this type of drive arrangement the driven or output shaft is normally at rest and when the cyclic drive is initiated the output shaft is accelerated to a particular rotary speed, remains there for a period of time and finally decelerates to zero at the end of the cycle. There have been several mechanisms developed which can generate this type of three-phase motion with the acceleration and deceleration phases being fairly well defined and controlled. However in those drive applications where the acceleration and deceleration phases must be very precisely controlled these mechanisms have been found lacking by reason of the backlash inherently present in those portions of the mechanism that generate the said acceleration and deceleration motions of said output shaft.

SUMMARY OF THE INVENTION

The present invention contemplates overcoming the problems presented by backlash that exists in the drive connections during the acceleration and deceleration phases of conventional threephase drive mechanisms, and this has been done by a rather simple modification of a conventional type three-phase mechanism. Here a conventional drive mechanism having a conjugate pair of cams and cam followers is modified so that a structural interference fit exists between the said cams and followers during said acceleration and deceleration phases whereby the driving and driven shafts supporting said conjugate cams and followers are placed under a constant and mutually opposed torsional stress that is effectively great enough to exceed any of the operating torque loads that are to be applied to the drive mechanism. In this manner all the backlash between said cams and followers is removed and the cam-generated acceleration and deceleration motions are then able to be precisely controlled in accordance with the exact shape given to said conjugate cams.

The primary object of the present invention is to afford an efficient three-phase motion drive mechanism having zero backlash during the acceleration and deceleration phases thereof.

DETAILED DESCRIPTION OF THE INVENTION

The conventional aspects of the instant apparatus will be described first after which a description will be made of how this apparatus is modified in accordance with the instant invention.

Figure 1:
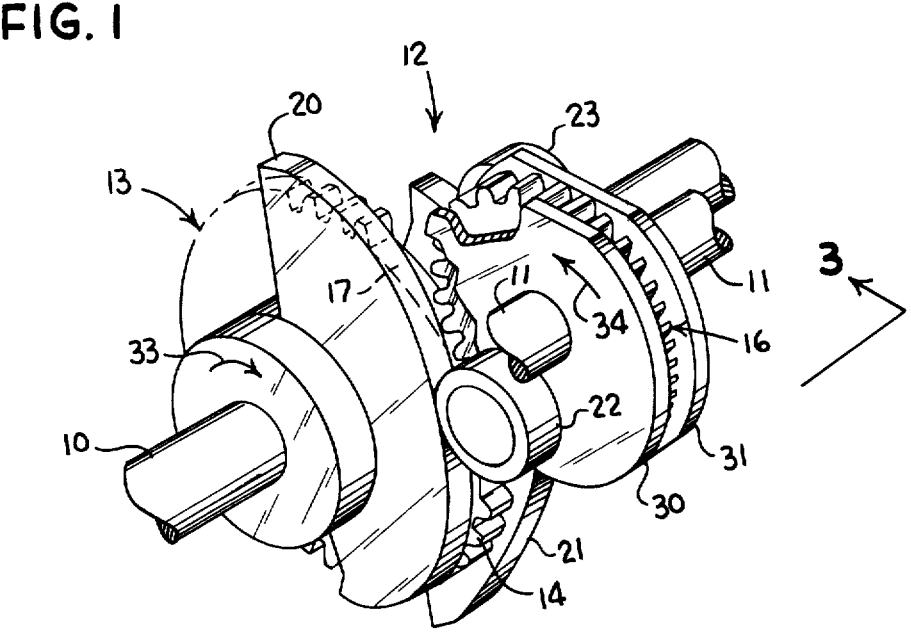
FIG. 1 is a perspective view, with some parts broken away, illustrating the construction of the present invention.
Figure 4:
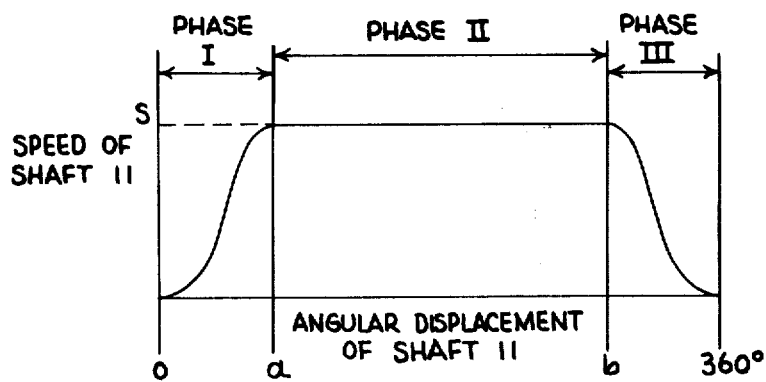
FIG. 4 is a diagram illustrating the nature of the three-phase type driven motion desired for the output shaft of the instant apparatus.

Referring to FIG. 1 there is shown an input shaft 10 and an output shaft 11. Coupling these two shafts is a transmission drive mechanism 12 that will produce a three-phase motion of the output shaft 11 in response to each revolution of the input shaft 10. This three-phase motion of a shaft 11 is illustrated in FIG. 4 wherein it may be seen that during the initial acceleration phase I the speed of shaft 11 gradually increases to a maximum speed S at angle $a$. Thereafter the speed remains substantially constant during second phase II, until an angle $b$ is reached. Between angle b and the completion of one revolution the shaft 11 decelerates through phase III till it again reaches a zero speed at 360°. Thereafter shafts 10 and 11 remain stationary until another one revolution cycle of input shaft 10 is initiated. It will be understood that the motion shown in FIG. 4 for shaft 11 is in response to a substantially uniform one revolution motion of input shaft 10.

Figure 2:
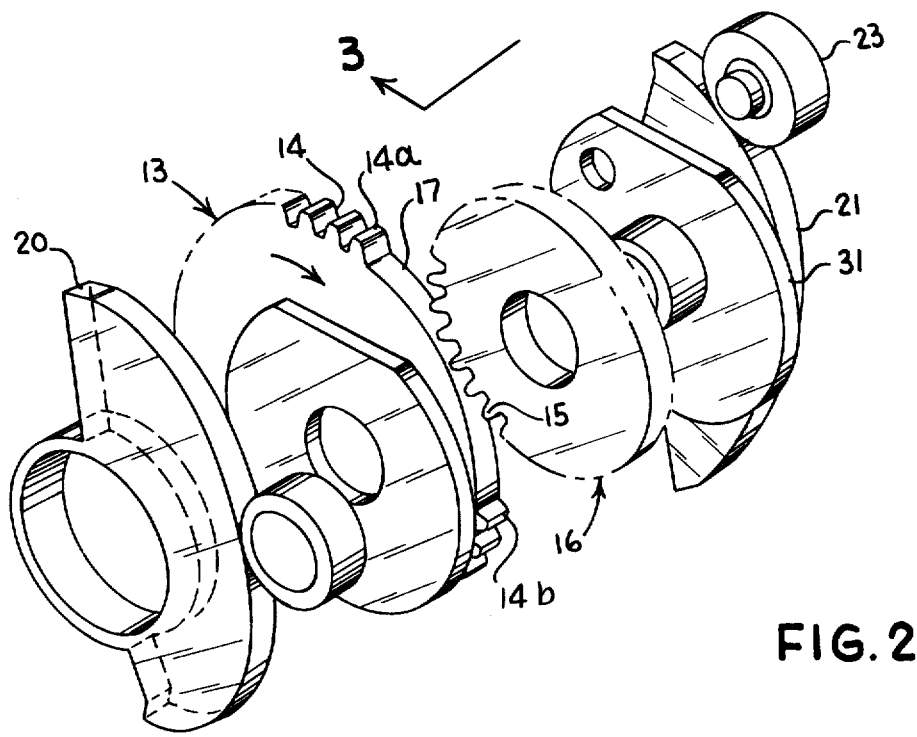
FIG. 2 is an exploded view of most of the parts shown in FIG. 1.
Figure 3:
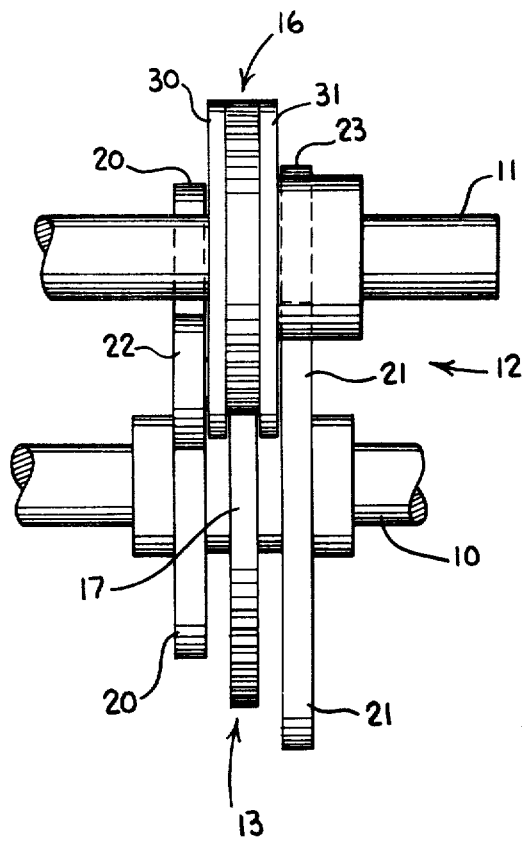
FIG. 3 is a side elevational view taken from the right as viewed in FIG. 1.

Referring to FIGS. 1-3 the mechanism 12 includes a mutilated gear 13 secured to the input shaft 10, the teeth 14 of gear 13 being adapted to mesh with the teeth 15 of a full gear 16 that is secured to the output shaft 11. The gear 13 has a portion of its toothed periphery removed as illustrated at 17. While the teeth of gears 13 and 16 are mutually meshing there will of course be a direct positive drive from shaft 10 to shaft 11 and such will produce the substantially uniform speed output motion of phase II as illustrated in FIG. 4. When however the portion 17 of gear 13 swings past gear 16, other means must be relied upon to rotatably couple the two shafts so as to produce the said acceleration phase I and the deceleration phase III. These other means include a pair of axially spaced conjugate cams 20 and 21 that are secured to shaft 10 and are adapted to respectively cooperate with a pair of cam followers 22 and 23. The followers 22 and 23 are rotatably mounted by any suitable pivot stud means fixed on the radially outer portions of a pair of discs 30, 31 respectively that are secured to output shaft 11; the discs being located immediately adjacent either side of the full gear 16.

In the normal position of the parts as shown in FIG. 1, the position of gear 13 is such that the peripheral center of its non-toothed portion 17 is adjacent the operative teeth of the gear 16. In this position of the parts the shaft 10 is stationary, and counterclockwise movement (as viewed in FIG. 1) of shaft 11 is prevented by cam follower 23 bearing against cam 21 and clockwise movement thereof is prevented by cam follower 22 bearing against cam 20. When the input shaft 10 is driven through one revolution in a clockwise direction 33, FIG. 1, the initial movement thereof will cause cam 20 to swingable displace the cam follower 22 so that said output shaft 11 will be displaced in a counterclockwise direction 34, the shape of cam 20 being such as to impart a desired acceleration to shaft 11 as illustrated in said motion phase I of FIG. 4. During this initial acceleration movement of shaft 11 the conjugate cam 21 and cam follower 23 are arranged so as to permit this phase I acceleration motion but to prevent any tendency for the cam follower 22 to be at any time thrown out of engagement with its associated cam 20. Thus during the initial portion of the one revolution rotation of shaft 10, the shaft 11 will be brought up to a desired rotative speed S, FIG. 4 during said phase I at which time the first effective tooth 14a, FIG. 2, of gear 13 will then mesh with the teeth 15 of the full gear 16 which is now rotating with shaft 11 at substantially the same peripheral speed as the gear 13. As gears 13 and 16 thus become meshed the cam followers 22 and 23 move out of contact with their respective cams 20 and 21 and will orbit about the axis of shaft 11 during the time period that said gears remain in mesh, this time period constituting the said phase II motion of FIG. 4 wherein the shaft 11 is driven at a substantially uniform speed. As the last effective tooth 14b, FIG. 2, of gear 13 leaves engagement with gear 16, the cam followers 22, 23 will re-engage their respective cams and the last portion of the one revolution of the input shaft 10 will then be characterized by a deceleration of the output shaft 11. This deceleration which constitutes motion phase III, FIG. 4, is controlled by the conjugate cam 21 and cam follower 23, the cam 20 and follower 22 during this time acting to prevent any movement of follower 23 away from contact with the operative surfaces of cam 21.

The construction and operation of the above described apparatus is conventional in nature and has been used by the assignee of this application in at least two of its commercial products, namely in its Model 5400 and 5600 Mailing Machines. While the above described apparatus is generally effective to produce a fairly predictable acceleration and deceleration of shaft 11 during the above noted motion phases I and III, FIG. 4, it is not capable of producing a very precisely controlled acceleration and deceleration movements of shaft 11. This impreciseness is due to the presence of backlash in the cam and follower system.

The above described conventional apparatus has been modified in accordance with the present invention so as to eliminate any backlash between cams 20, 21 and followers 22, 23 that might otherwise occur during said motion phases I and III. This modification involves small structural changes but produces not only a very significant improvement in the operation of the mechanism but also affords an unexpected long operational life for the parts involved. The structural changes include making the cam followers 22, 23 from a tough but slightly resilient plastic, namely "Delrin 500," and also dimensioning the said cams and cam followers so that there is a torsional interference fit between said pair of cams and their respective cam followers. Thus in accordance with the instant invention in order to assemble the parts together, as illustrated in FIG. 1, that portion of shaft 10 between cams 20 and 21 must be subjected to a torsional strain when cam followers 22, 23 respectively bear on the oppositely acting peripheries of said cams. That portion of shaft 11 between the two discs 30, 31 also will have an equal and opposite reactive torsional strain imposed thereon. The very slight resiliency afforded by the plastic material from which said cam followers are made will assist in accommodating the said interference fit. Under the above described conditions then the cams and their respective followers will be pressed against one another during the entire periods of said motion phases I and III and there will now be no backlash therebetween during the said acceleration and deceleration movements in that the said interference fit produces a normal torsional preload between said cams and followers that is effectively greater than any of the operational torsional loads that are to be experienced by the drive mechanism. The output shaft 11 may be thus very precisely controlled in an exact manner as defined by the effective configurations given to the camming surfaces of the conjugate cams 20 and 21. While the structural changes embodying the present invention are not great, the results obtained are very significant. A drive mechanism constructed in accordance with these modifications has been found to be very efficient, to have a long operational life, and to obviate most of the close manufacturing tolerance requirements normally associated with producing cam and follower type devices.

What is claimed is:

1. In a transmission drive mechanism for operatively coupling an input shaft to an output shaft and wherein one revolution of said input shaft is adapted to impart to said output shaft one revolution of movement having three phases including a first acceleration phase, a second substantially uniform speed phase and finally a deceleration phase; said mechanism having a mutilated gear mounted on said input shaft;

a full gear mounted on said output shaft and being adapted to mesh with the teeth of said mutilated gear;

a pair of conjugate cams rotatably secured to said output shaft;

a pair of cam followers carried by said output shaft and being adapted to respectively cooperate with said cams during only a portion of the said one revolution of said input shaft; said cams and followers when so mutually cooperating serving to develop said acceleration and deceleration phases: the improvement comprising said cam followers being constructed of a slightly resilient plastic material and arranged with respect to said cams such that during said portion of said one revolution of said input shaft a structural interference fit exists between said conjugate cams and said cam followers respectively whereby those portions of said shafts respectively disposed between said cams and between said followers are effectively held under opposed torsional stress by said cams and followers during said acceleration and deceleration phases so as to eliminate any operational backlash between said shafts during said acceleration and deceleration phases of the motion of said output shaft.

* * * * *